United States Patent
Borgarelli et al.

(10) Patent No.: US 11,105,404 B2
(45) Date of Patent: Aug. 31, 2021

(54) FAULT-TOLERANT ELECTROMECHANICAL LINEAR ACTUATORS

(71) Applicant: Umbragroup S.p.A., Foligno (IT)

(72) Inventors: Nicola Borgarelli, Foligno (IT); Luciano Pizzoni, Foligno (IT); Marco Nardeschi, Foligno (IT); Moreno D'Andrea, Foligno (IT); Giuliano Boccali, Foligno (IT)

(73) Assignee: UMBRAGROUP S.P.A., Foligno (IT)

( * ) Notice: Subject to any disclaimer, the term of this patent is extended or adjusted under 35 U.S.C. 154(b) by 0 days.

(21) Appl. No.: 16/617,759

(22) PCT Filed: May 30, 2018

(86) PCT No.: PCT/IB2018/053852
§ 371 (c)(1),
(2) Date: Nov. 27, 2019

(87) PCT Pub. No.: WO2018/220554
PCT Pub. Date: Dec. 6, 2018

(65) Prior Publication Data
US 2020/0103009 A1    Apr. 2, 2020

(30) Foreign Application Priority Data

May 30, 2017 (IT) .......................... 102017000058695
May 30, 2017 (IT) .......................... 102017000058753

(51) Int. Cl.
*F16H 25/20*    (2006.01)
*H02K 11/30*    (2016.01)
(Continued)

(52) U.S. Cl.
CPC ....... *F16H 25/205* (2013.01); *F16H 25/2454* (2013.01); *H02K 7/06* (2013.01);
(Continued)

(58) Field of Classification Search
CPC ............... F16H 25/205; F16H 25/2454; F16H 2025/204; F16H 2025/2075; H02K 11/30; H02K 7/06; H02K 7/102; H02K 2213/06
See application file for complete search history.

(56) References Cited

U.S. PATENT DOCUMENTS 3,210,852 A * 10/1965 Herndon .................. G01B 3/22
33/1 PT
3,422,696 A * 1/1969 Valenti ................ F16H 25/2056
74/89.35

(Continued)

FOREIGN PATENT DOCUMENTS

EP    1359345 A2    11/2003
EP    1359345 A3    4/2006
(Continued)

OTHER PUBLICATIONS

International Search Report and Written Opinion of the International Searching Authority, dated Sep. 4, 2018, in related International Application No. PCT/IB2018/053831, 14 pages.
(Continued)

*Primary Examiner* — David M Fenstermacher
(74) *Attorney, Agent, or Firm* — MH2 Technology Law Group LLP

(57) ABSTRACT

An electromechanical linear actuator may include: a containment structure; a pushing member designed to translate relative to the containment structure to at least partially come out of the containment structure during operation of the electromechanical linear actuator; a mechanical reduction apparatus in the containment structure and configured to rotate about an axis of rotation; motor means in the containment structure operably connected with the mechanical reduction apparatus to rotate about the axis of rotation; a shaft inserted in the mechanical reduction apparatus and connected to the pushing member, wherein the shaft is
(Continued)

mechanically connected with the mechanical reduction apparatus so that a rotational movement of the mechanical reduction apparatus will cause the shaft to translate along the axis of rotation; and a rotation-preventing mechanism operable on the shaft to prevent the shaft from rotating about the axis of rotation.

13 Claims, 5 Drawing Sheets

(51) Int. Cl.
  *F16H 25/24* (2006.01)
  *H02K 7/06* (2006.01)
  *H02K 7/102* (2006.01)
(52) U.S. Cl.
  CPC ............ *H02K 7/102* (2013.01); *H02K 11/30* (2016.01); *F16H 2025/204* (2013.01); *F16H 2025/2075* (2013.01); *H02K 2213/06* (2013.01)

(56) References Cited

U.S. PATENT DOCUMENTS

| | | | | |
|---|---|---|---|---|
| 3,803,926 | A * | 4/1974 | Winter | F16H 25/2204 74/89.3 |
| 4,179,944 | A | 12/1979 | Conner | |
| 5,214,972 | A | 6/1993 | Larson et al. | |
| 6,234,034 | B1 * | 5/2001 | Ando | F16H 25/2472 187/267 |
| 6,247,667 | B1 * | 6/2001 | Fenny | B64C 29/0033 244/56 |
| 7,044,012 | B2 | 5/2006 | Dubus et al. | |
| 7,963,529 | B2 * | 6/2011 | Oteman | B60G 17/0157 280/5.515 |
| 8,109,163 | B2 * | 2/2012 | Hudson | F16H 25/205 74/89.25 |
| 8,136,418 | B2 * | 3/2012 | Behar | B64C 13/341 74/89.23 |
| 8,230,750 | B2 * | 7/2012 | Flatt | B64C 13/341 74/89.38 |
| 8,567,279 | B2 * | 10/2013 | Seto | F16H 25/2252 74/424.91 |
| 8,960,031 | B2 * | 2/2015 | Keech | F16H 25/205 74/89.26 |
| 9,933,058 | B1 * | 4/2018 | Muster | F16H 25/2015 |
| 10,066,715 | B2 * | 9/2018 | Larson | F16H 25/2015 |
| 10,619,715 | B2 * | 4/2020 | Tsai | F16H 25/2454 |
| 10,677,329 | B2 * | 6/2020 | Eyraud | F16H 25/22 |
| 2005/0269887 | A1 | 12/2005 | Blanding et al. | |
| 2010/0242643 | A1 | 9/2010 | Waide | |
| 2013/0249464 | A1 | 9/2013 | Knox et al. | |
| 2015/0075306 | A1 * | 3/2015 | Castelli | B66F 3/10 74/89.35 |
| 2015/0276029 | A1 | 10/2015 | Marvin et al. | |
| 2015/0308549 | A1 | 10/2015 | Hirai et al. | |
| 2016/0123445 | A1 * | 5/2016 | Drennen | F16D 65/18 74/434 |
| 2016/0226349 | A1 * | 8/2016 | Mastrocola | H02K 11/21 |
| 2018/0087634 | A1 * | 3/2018 | Muster | F16H 25/2204 |
| 2020/0103009 | A1 * | 4/2020 | Borgarelli | H02K 11/30 |
| 2020/0164457 | A1 * | 5/2020 | Rosengren | B23K 11/318 |
| 2020/0300344 | A1 * | 9/2020 | Matsuto | F16H 25/2454 |
| 2020/0393028 | A1 * | 12/2020 | Mengel | A61G 7/018 |

FOREIGN PATENT DOCUMENTS

| | | |
|---|---|---|
| WO | 2007024220 A1 | 3/2007 |
| WO | 2010027701 A1 | 3/2010 |

OTHER PUBLICATIONS

International Search Report and Written Opinion of the International Searching Authority, dated Oct. 8, 2018, in corresponding International Application No. PCT/IB2018/053852, 13 pages.
International Preliminary Report on Patentability, dated Sep. 16, 2019, in corresponding International Application No. PCT/IB2018/053852, 7 pages.

\* cited by examiner

FAULT-TOLERANT ELECTROMECHANICAL LINEAR ACTUATORS

CROSS-REFERENCE TO RELATED APPLICATION(S)

This application is a national stage entry from International Application No. PCT/IB2018/053852, filed on May 30, 2018, in the Receiving Office ("RO/IB") of the International Bureau of the World Intellectual Property Organization ("WIPO"), and published as International Publication No. WO 2018/220554 A1 on Dec. 6, 2018. International Application No. PCT/IB2018/053852 claims priority from Italian Patent Application No. 102017000058695, filed on May 30, 2017, in the Italian Patent and Trademark Office ("IPTO") and claims priority from Italian Patent Application No. 102017000058753, filed on May 30, 2017, in the IPTO. The entire contents of all of these patent applications and publications are incorporated herein by reference.

FIELD OF THE APPLICATION

The present disclosure relates to an electromechanical linear actuator as defined in the preamble of claim 1.

Particularly, but without limitation, the present invention relates to an electromechanical linear actuator for controlling a control surface of an aircraft, a boat or the steering system of a vehicle or similar applications.

DESCRIPTION OF PRIOR ART

Electromechanical linear actuators are known, which are equipped with command and control electronics, are driven by an electric motor, and have the task of converting the rotary motion of the electric motor into a reciprocating linear motion of a pushing member to control the position of a control surface.

For this purpose, the electric motor is connected, via a reduction apparatus, to the pushing member, which is in turn connected to the control surface to control the position that this surface is to assume in response to the controls received from the command and control electronics.

Usually, the reduction apparatus comprises a lead nut with a screw sliding thereon (or a screw with a lead nut sliding thereon), which in turn is connected to the pushing member and, whereby a rotation-preventing device, only is allowed to the screw (or the lead nut) only the a linear and non-rotational movement of, thereby providing the linear reciprocating motion of the pushing member.

Such electromechanical linear actuators have been used, for example, to control the secondary control surfaces of an aircraft, such as air brakes, spoilers, flaps, trim tabs, but also to open hatches and other uses requiring low power, speed and response time i.e. for the so-called "non-safety critical" applications.

PRIOR ART PROBLEM

However, the reliability of an electromechanical actuator as defined above does not allow it to be used in installations designed to control primary control surfaces of an aircraft, the swashplate of a helicopter, the steering system of a vehicle or the rudder of a ship, i.e. more generally all "safety critical" applications.

This is because the above described electromechanical actuator is poorly reliable both in its electrical part, i.e. the electric motor, and in the command and control electronics, as well as the possibility of a seizure of the mechanical part (the so-called mechanical "jamming").

In an attempt to obviate this drawback, for example, architectures have been used which either include two identical actuators that move the same control surface, thereby providing electrical, electronic and mechanical redundancy, but also generally increasing the weight and complexity of the system, or have a single actuator equipped with a differential gear box, which affords the use of two independent electric motors and two independent electronics to move the same mechanical system.

Furthermore, the aforementioned "safety critical" applications require very fast operation, which does not allow the use of differential gear boxes, generally characterized by excessive working clearances.

US 2013249464, WO2010027701 and US 2005269887 disclose examples of electromechanical actuators that do not provide enough redundancy to ensure "fault tolerance" against mechanical, electrical and electronic faults.

Namely, "US 464" and "WO 701" disclose actuators equipped with two mutually dependent electric motors, directly coupled to the shaft to be driven via ball nuts/screw. Therefore, a mechanical fault, e.g. at the motor-shaft coupling, for one or both motors, will cause the actuator to stop. In addition, motors must be sized to be able to generate a torque that can ensure operation both in a fully operational state and in case of electric and/or electronic fault occurring in one of the two motors.

On the other hand "US 887" discloses an actuator having a set of electric motors, directly coupled to the shaft to be driven via recirculating rollers. Therefore, also in this case, a mechanical fault occurring in the motor-shaft coupling will cause the actuator to stall and prevent the shaft from being driven.

SUMMARY OF THE INVENTION

The object of the present invention is to provide an electromechanical linear actuator that can solve the above described prior art problems.

These objects are fulfilled by an electromechanical linear actuator as defined in claim 1 hereinbelow.

ADVANTAGES OF THE INVENTION

One embodiment of the present invention can provide an electromechanical linear actuator of the Fault Tolerant Differential Direct Drive type that can be also used for the control of primary surfaces, as it allows the translation of the pushing member even in case of failure in the electric part, in the control electronics and/or in case of mechanical jamming.

Furthermore, one embodiment of the present invention can provide an electromechanical linear actuator whose dynamic performances are considerably improved as compared with electromechanical actuators that use differential systems such as gear boxes.

Also, one embodiment of the present invention can provide an electromechanical linear actuator that typically has a lighter weight and reduced overall dimensions as compared with electromechanical actuators that use gear boxes and other differential devices.

In addition, one embodiment of the present invention can provide an electromechanical linear actuator that is more reliable than electromechanical actuators that use gear boxes and other differential devices.

Furthermore, one embodiment of the present invention can provide an electromechanical linear actuator that can ensure fault tolerance against electronic, electrical and mechanical faults. Particularly, the use of an intermediate stage increases redundancies in the system, thereby ensuring high reliability as compared with the electromechanical actuators that are currently employed in the above described prior art.

Finally, one embodiment of the present invention can provide an electromechanical linear actuator that can minimize friction, especially at low temperatures, thereby optimizing the overall efficiency of the actuator as compared with electromechanical actuators that use gear boxes and other differential devices.

BRIEF DETAILS OF THE DRAWINGS

The characteristics and advantages of the present disclosure will appear from the following detailed description of a possible practical embodiment, illustrated as a non-limiting example in the set of drawings, in which:

FIGS. 1A and 1B show two possible implementation scenarios for the electromechanical linear actuator of the present invention, where in the FIG. 1A is schematically depicted a primary control surface of an aircraft operated by a single-acting actuator (i.e. with a single pushing member projecting out of one side of the actuator) and in the FIG. 1B is schematically depicted a steering assembly of a vehicle operated by a double-acting actuator (i.e. with two pushing members projecting out of both sides of the actuator);

DETAILED DESCRIPTION

Even when this is not expressly stated, the individual features as described with reference to the particular embodiments shall be intended as auxiliary to and/or interchangeable with other features described with reference to other exemplary embodiments.

Figure 1A:
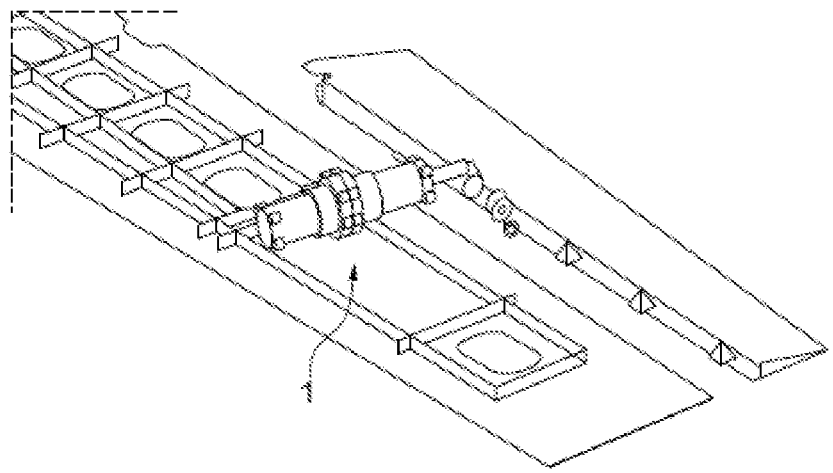
Figure 1B:
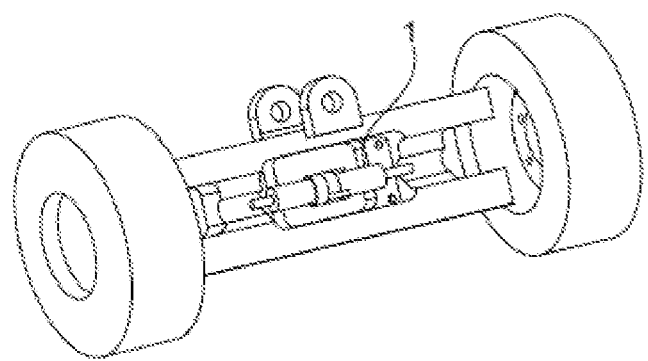

Referring to the accompanying figures, numeral 1 generally designates an electromechanical linear actuator of the present invention and particularly FIG. 1A schematically depicts a primary control surface of an aircraft operated by the single-acting actuator 1 (i.e. having a single pushing member projecting out of one side of the actuator) and FIG. 1B schematically depicts a steering assembly of a vehicle operated by a double-acting actuator (i.e. having two pushing members projecting out of both sides of the actuator).

Figure 2:
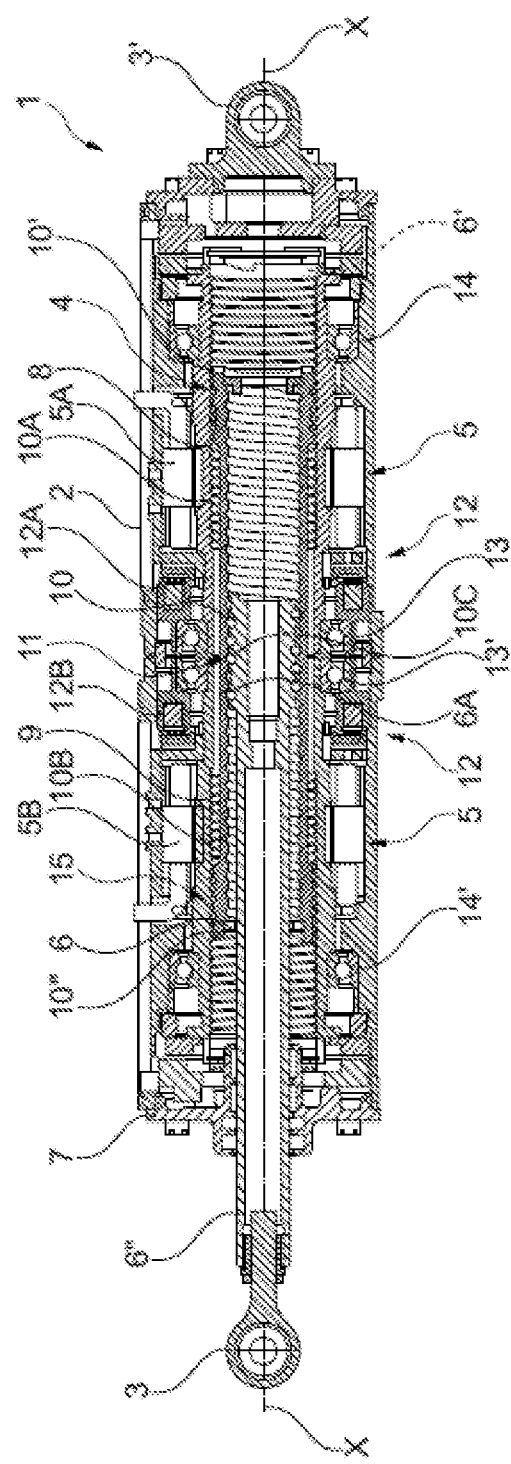
FIG. 2 shows a sectional view of the electromechanical linear actuator according to a first embodiment of the present invention.
Figure 3:
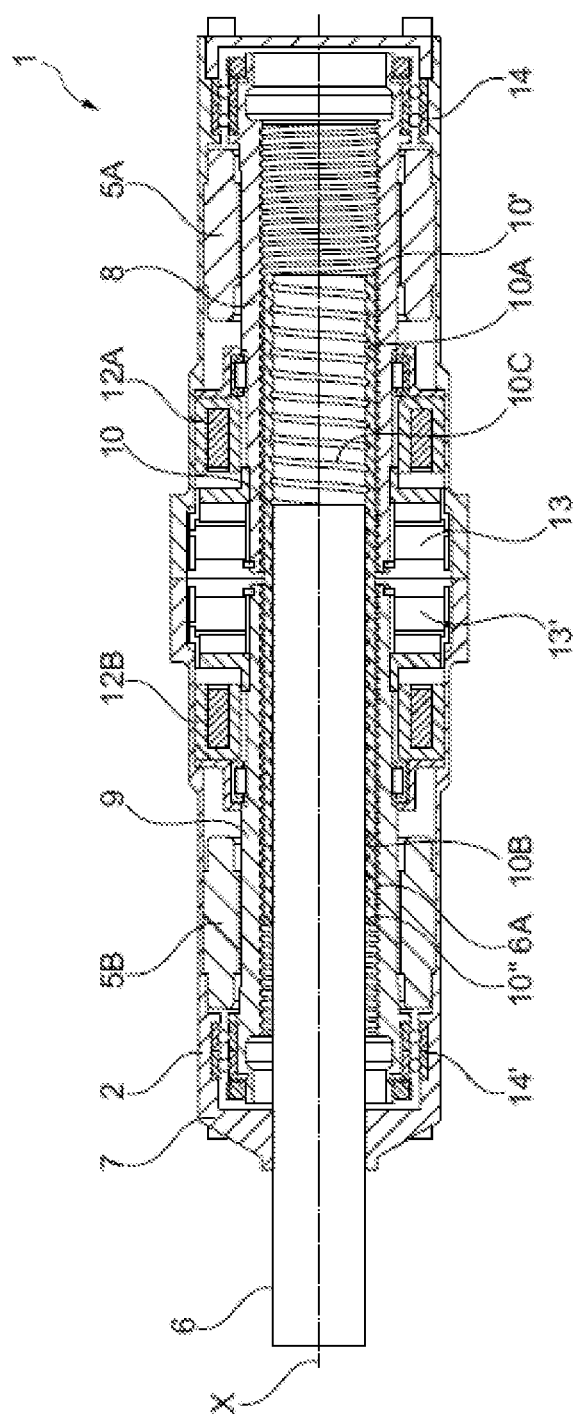
FIG. 3 shows a schematic view of the actuator of FIG. 2 in which certain elements of FIG. 2 have been omitted or simplified in view of highlighting the characteristic features of the actuator of the present invention.
Figure 4:
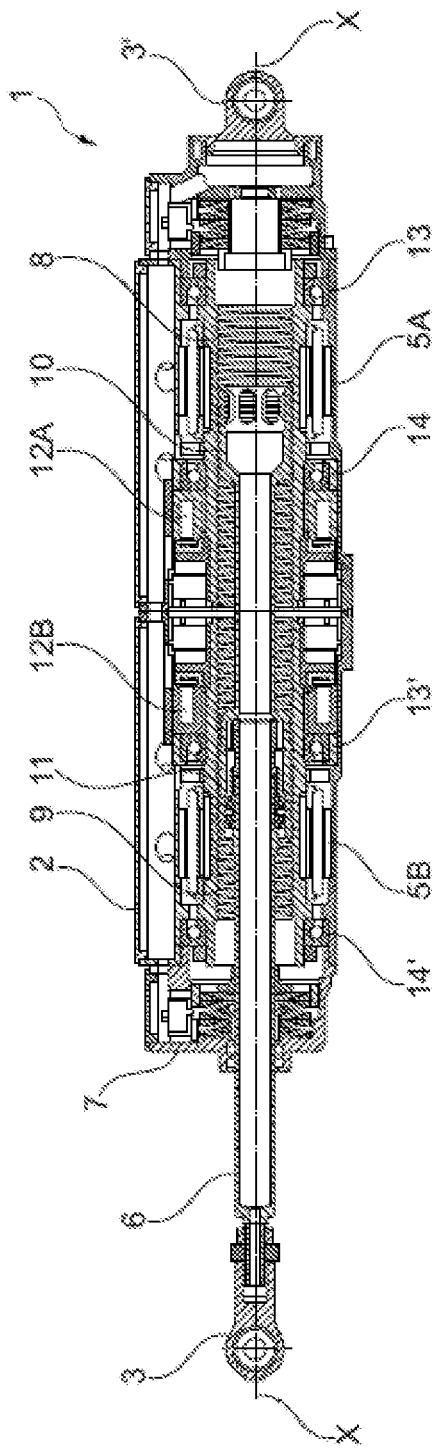
FIG. 4 shows a sectional view of the electromechanical linear actuator according to a second embodiment of the present invention.

Referring to FIGS. 2 to 4, the actuator 1 comprises a containment structure 2, preferably rigid, and a pushing member 3.

The pushing member 3 constitutes the active element of the actuator 1.

Particularly, the pushing member 3 is designed to translate, relative to the containment structure 2, to at least partially come out of the containment structure 2 during operation of the actuator 1.

The translation of the pushing member 3 happens through a special aperture formed in the containment structure 2.

The actuator 1 comprises a mechanical reduction apparatus 4, disposed in the containment structure 2, which is configured to rotate about an axis of rotation X.

The actuator 1 comprises motor means 5, disposed in the containment structure 2, which are operatively connected with the mechanical reduction apparatus 4 to rotate it about the axis X.

The actuator 1 comprises a shaft 6, inserted/located into the mechanical reduction apparatus 4, which is connected with the pushing member 3.

Particularly, the shaft 6 comprises a first terminal end 6' and a second terminal end 6", where the first terminal end 6' is connected to a coupling/hooking eye 3'. The second terminal end 6" may come out of the containment structure 2 with the pushing member 3 at least partially during operation of the actuator 1.

The actuator 1 comprises a rotation-preventing mechanism 7 which is active/on the shaft 6 to prevent the shaft from rotating about the axis of rotation X.

Therefore, the shaft 6 is connected with the mechanical reduction apparatus 4 in such a manner that a rotation of the mechanical reduction apparatus 4 will cause a translation of the shaft 6 along the axis of rotation X and hence a linear reciprocating motion/displacement of the pushing member 3.

Advantageously, the mechanical reduction apparatus 4 comprises a first lead nut 8 and a second lead nut 9 which are independent of each other, i.e. two separate and distinct lead nuts.

Each lead nut 8, 9 has its own thread and its own thread direction, and are adapted to rotate about the axis of rotation X under the action of the motor means 5.

Each lead nut 8, 9 has a main direction/a prevalent development direction of extension which coincides with the aforementioned axis of rotation X.

Each lead nut 8, 9 is enabled to only rotate about the axis of rotation X while to each of them the translation along the axis of rotation X is prevented, for example by means of appropriate stopping shoulders or other solutions known to the skilled person and not described herein.

In order to allow each lead nut 8 and 9 to rotate about the axis of rotation X, the actuator 1 comprises a pair of bearings 13-14 and 13'-14' for each lead nut, disposed in the containment structure 2.

For example, the pair of bearings 13-14 are relative to the lead nut 8 and 13'-14' are relative to the lead nut 9.

Thus, the lead nuts 8 and 9 are able to rotate about the axis of rotation X under the action of the motor means 5, which are connected to the lead nut or by means of a kinematic chain (e.g. a gear box comprising differential gearing), or are preferably directly connected to such lead nuts as better explained hereafter.

In one aspect, the mechanical reduction apparatus 4 comprises coupling means 10, 11 and 15, which are configured to mechanically couple the first and second lead nuts 8, 9 with the shaft 6, so that a rotational movement of the first and/or second lead nuts 8, 9 will cause a translation of the shaft 6 along the axis of rotation X.

In other words, the actuator 1 is able to ensure a translation of the shaft 6 along the axis of rotation X even in failure conditions of the motor means 5, or their respective electronics, or in case of jamming of the coupling means 10, 11 and 15 with one of the two lead nuts 8, 9 indistinctly.

This is achieved without using differential systems, such as gear boxes.

For this purpose, the coupling means 10, 11 and 15 comprise:
- an intermediate coupling stage 10 inserted inside the first and second lead nuts 8, 9.
- respective first mechanical connection means 15 configured to mechanically couple each lead nut 8 and 9 with the intermediate coupling stage 10;
- second mechanical connection means 11.

Particularly, the shaft 6 is fitted into the intermediate coupling stage 10 and is connected with the latter via the second mechanical connection means 11.

In one aspect, the intermediate coupling stage 10, extends about an axis that coincides with the aforementioned axis of rotation X.

The intermediate coupling stage 10 has an inner cavity, preferably a through cavity, which extends along an axis that coincides with the aforementioned axis of rotation X, and which imparts a tubular shape to such intermediate coupling stage 10.

Therefore, also referring to FIGS. 2 to 4, the shaft 6 is coaxial with both the intermediate coupling stage 10 and the first and second lead nuts 8 and 9 along the axis of rotation X, so as the intermediate coupling stage 10 is coaxial with the first and second lead nuts 8 and 9 still along the axis of rotation X.

In one aspect, still referring to FIGS. 2 to 4, it shall be noted that the first mechanical connection means 15 preferably comprise a nut and screw coupling or, alternatively, a satellite roller or recirculating roller coupling or a recirculating ball screw.

Referring now to FIGS. 2 and 3, which shows a preferred embodiment of the coupling between the intermediate stage 10 and the shaft 6, it shall be noted that the shaft 6 is a screw shaft and the second mechanical connection means 11 comprise a nut and screw coupling between the screw shaft 6 and the intermediate coupling stage 10.

With this embodiment, a rotary motion imparted by the motor means 5 to the first and/or second lead nuts 8, 9, will cause a rotational, translational or rototranslational movement of the intermediate coupling stage 10 along the axis of rotation X, and the intermediate coupling stage 10 will in turn cause a translational movement of the screw shaft 6 along said axis of rotation X.

Therefore, in the preferred embodiment, the intermediate coupling stage 10 is interconnected with each lead nut 8 and 9 via a respective nut and screw coupling obtained with the respective first mechanical connection means 11 and, after a rotation of the first lead nut 8 and/or the second lead nut 9 imparted by motor means 5, will cause a rotational, translational, or rototranslational movement of the intermediate coupling stage 10 along the axis of rotation X, and that the latter, i.e. the intermediate coupling stage 10, will cause a translational displacement of the screw shaft 6 along said axis of rotation X.

For this purpose, in the preferred embodiment, the intermediate coupling stage 10 has externally a first external thread 10A and a second external thread 10B i.e. formed on its outer surface, each being designed to be coupled with a respective thread of a lead nut 8 or 9.

For example, the first thread 10A is coupled with the thread of the lead nut 8 and the second thread 10B is coupled with the thread of the lead nut 9.

In one aspect, it is expected that the first thread 10A is located proximate to a first terminal end 10' of the intermediate coupling stage 10 and said second thread 10B is located proximate to a second terminal end 10" opposite to the first terminal end 10' of the intermediate coupling stage 10.

These first and second threads 10A and 10B preferably cover only a portion of the outer surface of the intermediate coupling stage 10, and particularly a portion that starts from the respective terminal ends 10', 10" and extends toward the central zone of the intermediate coupling stage 10.

Since the first lead nut 8 and the second lead nut 9 are independent of each other but are still mechanically connected by the engagement of the screw lead nut with the intermediate coupling stage 10, then also the first and second threads 10A and 10B of the intermediate coupling stage 10 are fastened together, as they are formed on the same outer surface of the intermediate element 10.

In one aspect, still in the preferred embodiment of the actuator 1 as shown in FIGS. 2 and 3, it is expected that the intermediate coupling stage 10 has internally a third internal thread 10C, i.e. formed on its inner surface, which is designed to be coupled with a thread 6A of the screw shaft 6, such thread 6A being formed on the outer surface of the screw shaft.

In other words, the screw shaft 6 has the thread 6A with a given pitch and a given direction, which is interconnected with the third thread 10C formed in the intermediate coupling stage 10, such that a nut and screw coupling is created thereby.

In one aspect, the pitch of the thread 6A of the screw shaft 6 is different from, for instance greater or smaller than, the pitch of the thread of the first and second lead nuts 8 and 9.

In particular, it is expected that:
the thread pitch of the first lead nut 8 is left-handed, whereas the one of the second lead nut 9 is right-handed, or vice versa (i.e. the thread direction of the first lead nut 8 is right-handed and the one of the second lead nut 9 is left-handed).

Referring now to FIG. 4, which shows an alternative embodiment of the coupling between the intermediate stage 10 and the shaft 6 (which is not a screw shaft as shown in FIG. 2), it shall be noted that the second mechanical connection means 11 are embodied by bearings. If the coupling between the intermediate stage 10 and the shaft 6 is provided by bearings, then the shaft 6 will only translate in response to a translation or rototranslation of the intermediate stage 10.

If the intermediate stage 10 rotates, then the shaft 6 cannot translate. In this case, the actuator 1 still ensures electrical and electronic redundancy, but loses its mechanical redundancy (jamming). For example, if jamming occurs between a lead nut 8 or 9 and the intermediate stage 10, then the intermediate stage 10 will not be able to translate and then it can not drive the shaft 6.

Alternatively, the second mechanical connection means 11 can be embodied by a satellite rollers or recirculating roller coupling or a recirculating ball screw.

As discussed above, the lead nuts 8 and 9 are able to rotate about the axis of rotation X under the action of the motor means 5, which are preferably directly connected to such lead nuts.

For this purpose, the motor means 5 comprise two electric motors 5A and 5B, each directly operable/active on a respective lead nut 8 or 9.

Particularly, each electric motor 5A, 5B comprises a stator fixed to the containment structure 2 and a rotor fixed to its respective lead nut 8, 9.

Therefore, the rotor of each electric motor 5A and 5B is rigidly connected with a respective lead nut 8 or 9, which, one or both of the latter, are rotated by the electromagnetic interaction of their respective rotor (generally with permanent magnets) and the stator.

For example, also referring to FIG. 3, it shall be noted that the rotor of the electric motor 5A is fixed to the first lead nut 8, whereas the rotor of the motor 5B is fixed to the second lead nut 9.

In an alternative embodiment, the motor means 5 are designed to be connected with a respective lead nut 8 or 9 via a kinematic chain (not shown) to distribute the torque to one and/or both of said first and second lead nuts 8 or 9.

In one aspect, in order to fix each rotor of the electric motors 5A and 5B to its respective lead nut 8 and 9, the actuator 1 comprises fixation means, generally referenced 5D.

Particularly, the fixation means 5D comprise:
an adhesive layer 20 interposed between the outer surface of the lead nut 8, 9 and the rotor associated therewith to rigidly join it thereto;
a sleeve 21 disposed outside the rotor to hold in a predetermined position.

Figure 5:
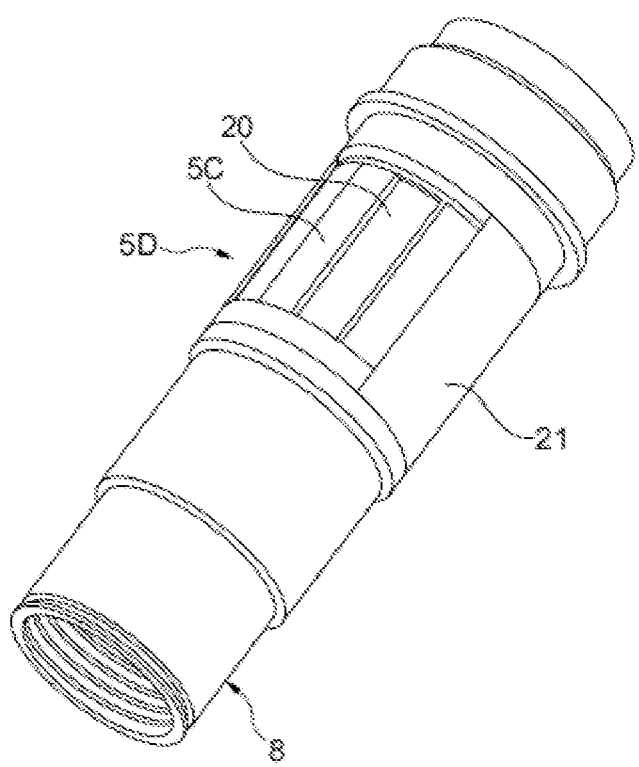
FIG. 5 shows a perspective view of a possible embodiment of the coupling between an electric motor and the mechanical reduction apparatus of the actuator, according to the present invention.

Also referring to FIG. 5, which shows the lead nut 8 and the rotor 5C in the motor 5A, it shall be noted that the rotor 5C is composed of a plurality of magnetic elements circumferentially arranged on the lead nut while the sleeve 21, for instance made of metal, surrounds the rotor 5C along the outer surface of the lead nut 8.

The actuator 1 comprises braking means 12, operable/active on the first and/or second lead nuts 8, 9 to brake the rotation about the axis of rotation X of one and/or both of said first and second lead nuts, according to the operating conditions of the actuator 1 as described in greater detail hereinafter.

Particularly, the braking means 12 comprise two electric types brakes 12A and 12B, each operable on a respective lead nut 8 or 9.

The brakes are, for example, electromagnetic coil brakes. Namely, they are of the normally open configuration (with the brake being closed by actuating the electromagnet), or of the normally closed configuration (with the brake being opened by actuating the electromagnet).

For example, also referring to FIG. 3, it shall be noted that the brake 12A operates on the first lead nut 8, and the brake 12B operates on the second lead nut 9.

It shall be noted that each electric motor 5A and 5B as well as each electric brake 12A and 12B is controlled by its own control electronics (not shown in the figures), which is designed to check and command the operating state and effectiveness of the aforementioned electric motors 5A and 5B and electric brakes 12A and 12B.

Therefore, in the preferred embodiment as described (i.e. the one as shown in FIG. 2 or 3), the actuator 1 comprises two independent electric motors 5A and 5B and two independent electronics which drive a fully redundant mechanics (i.e. two lead nuts 8 and 9, an intermediate stage 10 and a screw shaft 6) without using gear boxes and comprises the use of two independent lead nuts 8 and 9, one with a right-handed thread direction and the other with a left-handed thread direction, with which the rotors of the two electric motors 5A and 5B are directly connected. The two lead nuts 8 and 9 engage the intermediate stage 10 which has two distinct external threaded portions 10A and 10B, one that engages with the left-handed lead nut and one that engages the right-handed lead nut. Therefore, the intermediate stage 10 has a thread 10C that engages the thread 6A of the screw shaft 6 which does not rotate thanks to the rotation-preventing device 7.

It should be further noted, still in the preferred embodiment as described with reference to FIG. 2 or 3, that the right-handed and left-handed coupling between the intermediate stage 10 and the respective lead nuts 8 and 9, allows to know the position of the intermediate stage 10 with respect to the lead nuts and the screw shaft 6. This will define a much smaller positioning range in which jamming may occur between the intermediate stage 10 and the lead nuts 8 and/or 9 or between the intermediate stage 10 and the screw shaft 6 as compared with prior art actuators. Thus, a much more compact actuator will be advantageously obtained, which has a lighter weight while ensuring that the actuator 1 will cover its entire stroke even under a jamming condition.

The operation of the actuator 1 will be now described with reference to its preferred embodiment (FIG. 2 or 3).

Normal Operating Mode

During normal operation, the two electric motors 5A and 5B may drive the two lead nuts 8 and 9, upon request by respective electronics, in the same direction of rotation or in opposite directions of rotation with respect to each other.

If the operation of the two motors 5A and 5B moves the two lead nuts 8 and 9 in the same direction of rotation, then the intermediate stage 10 rotates in rigidly joined fashion with the two lead nuts 8 and 9. Due to the rotation-preventing device 7, the screw shaft 6 translates.

If the operation of the two motors 5A and 5B moves the two lead nuts 8 and 9 in opposite directions, then the torque of one motor is counterbalanced by the torque of the other motor and the intermediate stage 10 translates. The screw shaft 6 translates in rigidly joined fashion with the intermediate stage 10.

As a result, in the normal operating mode, the intermediate stage 10 may rotate, translate or roto-translate and the screw shaft 6, due to the presence of the rotation-preventing device 7, translates along the axis of rotation X to thereby provide a linear reciprocating motion, still along the axis of rotation X, of the pushing member 3.

Operating mode in case of failure (indistinctly failure of one of either electric motor or respective electronics)

In case of indistinctly failure in either of the two electric motors 5A or 5B or their respective electronics, then the electric brake 12A or 12B is actuated and stops the rotation of the lead nut 8 or 9 on the side of the faulty motor/electronics, e.g. the brake 12A stops the rotation of the lead nut 8 if the failure is in the motor 5A and/or its command and control electronics.

In this scenario, the intermediate stage 10 will roto-translate along the axis of rotation X, due to the rotation of the lead nut 9 actuated by the electric motor 5B. Due to the rotation-preventing device 7, the screw shaft 6 will translate along the axis of rotation X in response to the translation and rotation of the intermediate stage 10, as the latter is coupled by its thread 10C with the thread 6A of the screw shaft 6.

The translation of the screw shaft 6 provides the linear reciprocating motion, still along the axis of rotation X of the pushing member 3.

Operating mode in case of failure (jamming of the intermediate stage of the screw with either of the lead nuts)

This mode is applicable in case of mechanical failure (jamming) of the intermediate stage 10 with either of the two lead nuts 8 or 9, e g jamming of the intermediate stage 10 with the lead nut 8.

In this scenario, the two electric motors 5A and 5B are actuated by their respective electronics in the same direction of rotation. The intermediate stage 10 rotates about the axis of rotation X in rigidly joined fashion with the two lead nuts 8 and 9. The screw shaft 6, due to the presence of the rotation-preventing device 7, translates along the axis of rotation X to thereby provide a linear reciprocating motion, still along the axis of rotation X of the pushing member 3.

Operating mode in case of failure (jamming of the screw shaft with the intermediate stage of the screw)

In case of failure (jamming) of the screw shaft 6 with the intermediate stage 10, then the two electric motors 5A and 5B are actuated by their respective electronics in opposite directions of rotation. The torque of one motor is counterbalanced by the torque of the other motor and the intermediate stage 10 only translates along the axis of rotation X. The screw shaft 6 translates along the axis of rotation X in rigidly joined fashion with the intermediate stage 10, to thereby provide a linear reciprocating motion, still along the axis of rotation X, of the pushing member 3.

Those skilled in the art will obviously appreciate that a number of changes and variants as described above may be made to fulfill particular requirements, without departure from the scope of the invention, as defined in the following claims.

The invention claimed is:

1. An electromechanical linear actuator, comprising:
    a containment structure;
    a pushing member designed to translate relative to the containment structure to at least partially come out of the containment structure during operation of the electromechanical linear actuator;
    a mechanical reduction apparatus in the containment structure and configured to rotate about an axis of rotation;
    motor means in the containment structure operably connected with the mechanical reduction apparatus to rotate about the axis of rotation;
    a shaft inserted in the mechanical reduction apparatus and connected to the pushing member, wherein the shaft is mechanically connected with the mechanical reduction apparatus so that a rotational movement of the mechanical reduction apparatus will cause the shaft to translate along the axis of rotation; and
    a rotation-preventing mechanism operable on the shaft to prevent the shaft from rotating about the axis of rotation;
    wherein the mechanical reduction apparatus comprises:
        independent first and second lead nuts, each having its own thread and its own thread direction, wherein the first and second lead nuts are configured to turn about the axis of rotation by action of the motor means; and
        coupling means, which are configured to mechanically couple the first and second lead nuts with the shaft, so that a rotational movement of the first and/or second lead nuts will cause a translation of the shaft along the axis of rotation;
    wherein the coupling means comprises:
        an intermediate coupling stage inserted inside the first and second lead nuts;
        respective first mechanical connection means for coupling the intermediate coupling stage with each lead nut; and
        second mechanical connection means;
        wherein the shaft is fitted into the intermediate coupling stage and is connected with the intermediate coupling stage through the second mechanical connection means,
    wherein the shaft is a screw shaft and the second mechanical connection means comprises a nut and screw assembly between the screw shaft and the intermediate coupling stage, such that the rotational movement of the first and/or second lead nuts will cause a rotational, translational, or rototranslational movement of the intermediate coupling stage along said axis of rotation and such that the intermediate coupling stage in turn causes a translational movement of the screw shaft along the axis of rotation,
        wherein a pitch of the thread of the first lead nut is opposite to a pitch of the thread of the second lead nut, and
        wherein the intermediate coupling stage has:
            externally, first and second threads each configured to couple with a respective lead nut; and
            internally, a third thread configured to couple with a thread of the screw shaft.

2. The electromechanical linear actuator of claim 1, wherein the second mechanical connection means comprises satellite rollers, a recirculating roller coupling, or a recirculating ball screw, so that the rotational movement of the first and/or second lead nuts will cause the rotational or rototranslational movement of the intermediate coupling stage along the axis of rotation and the intermediate coupling stage, which in turn causes the translational movement of the shaft along the axis of rotation.

3. The electromechanical linear actuator of claim 1, wherein each of the respective first mechanical connection means comprises a nut and screw assembly, satellite rollers, a recirculating rollers coupling, or a recirculating ball screw.

4. The electromechanical linear actuator of claim 1, wherein a pitch of the thread of the screw shaft is different from the pitch of the thread of the first and second lead nuts.

5. The electromechanical linear actuator of claim 1, wherein the first thread is near a first terminal end of the intermediate coupling stage, and wherein the second thread is near a second terminal end opposite to the first terminal end of the intermediate coupling stage.

6. The electromechanical linear actuator of claim 1, wherein the shaft is coaxial with respect to both the intermediate coupling stage and with respect to the first and second lead nuts, along the axis of rotation, and wherein the intermediate coupling stage is coaxial with respect to the first and second lead nuts along the axis of rotation.

7. The electromechanical linear actuator of claim 1, wherein the motor means comprises two electric motors, each of which is active on a respective lead nut, and wherein each electric motor is controlled by its own command and control electronics.

8. The electromechanical linear actuator of claim 7, wherein each electric motor is directly connected with its respective lead nut, and wherein each electric motor comprises a stator fixed to the containment structure and a rotor fixed to the respective lead nut.

9. The electromechanical linear actuator of claim 1, further comprising braking means active on the first and second lead nuts to brake the rotation of the first and second lead nuts about the axis of rotation.

10. The electromechanical linear actuator of claim 9, wherein the braking means comprises two electric brakes, and wherein each of the electric brakes is active on a respective one of the lead nuts.

11. The electromechanical linear actuator of claim 8, further comprising: fixation means configured to fix each rotor to an outer surface of a respective one of the lead nuts.

12. The electromechanical linear actuator of claim 11, wherein the fixation means comprises:
   an adhesive layer interposed between the outer surface of one of the lead nuts and the respective rotor; and
   a sleeve outside the rotor that is configured to hold the rotor in a predetermined position.

13. The electromechanical linear actuator of claim 1, further comprising command and control electronics configured to control and monitor the motor means.

\* \* \* \* \*